United States Patent
Ito et al.

(10) Patent No.: US 10,412,257 B2
(45) Date of Patent: Sep. 10, 2019

(54) IMAGE READING APPARATUS

(71) Applicant: CANON KABUSHIKI KAISHA, Tokyo (JP)

(72) Inventors: Narumasa Ito, Utsunomiya (JP); Akira Matsumoto, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/157,470

(22) Filed: Oct. 11, 2018

(65) Prior Publication Data

US 2019/0116285 A1 Apr. 18, 2019

(30) Foreign Application Priority Data

Oct. 12, 2017 (JP) .................. 2017-198259

(51) Int. Cl.
*H04N 1/047* (2006.01)
*H04N 1/12* (2006.01)
*H04N 1/053* (2006.01)

(52) U.S. Cl.
CPC ........... *H04N 1/0473* (2013.01); *H04N 1/053* (2013.01); *H04N 1/1235* (2013.01)

(58) Field of Classification Search
CPC ........... H04N 1/02875; H04N 1/02201; H04N 1/03195
See application file for complete search history.

(56) References Cited

U.S. PATENT DOCUMENTS 9,277,082 B2 3/2016 Sugiyama et al.
2018/0352101 A1 12/2018 Takizawa et al.

FOREIGN PATENT DOCUMENTS

JP 2006265002 A 10/2006

*Primary Examiner* — King Y Poon
*Assistant Examiner* — Michael Burleson
(74) *Attorney, Agent, or Firm* — Carter, DeLuca & Farrell LLP

(57) ABSTRACT

An image reading apparatus according to the present invention includes: a conveyor which conveys an original in a first direction; a light transmitting member which is provided with coating in a first region of a surface facing the original; a reading unit which reads an image at a reading position of the original through the light transmitting member; and a controller which performs processing on the image and which changes the reading position by moving the reading unit when abnormality is detected in the processing. The coating includes a silicon-containing perfluoropolyether compound. An electrically-conductive member is provided in a second region located on the surface of the light transmitting member, upstream of the first region in a conveyance direction of the original. A contact angle of the coating at a position corresponding to the reading position in the first region is appropriately set.

9 Claims, 10 Drawing Sheets

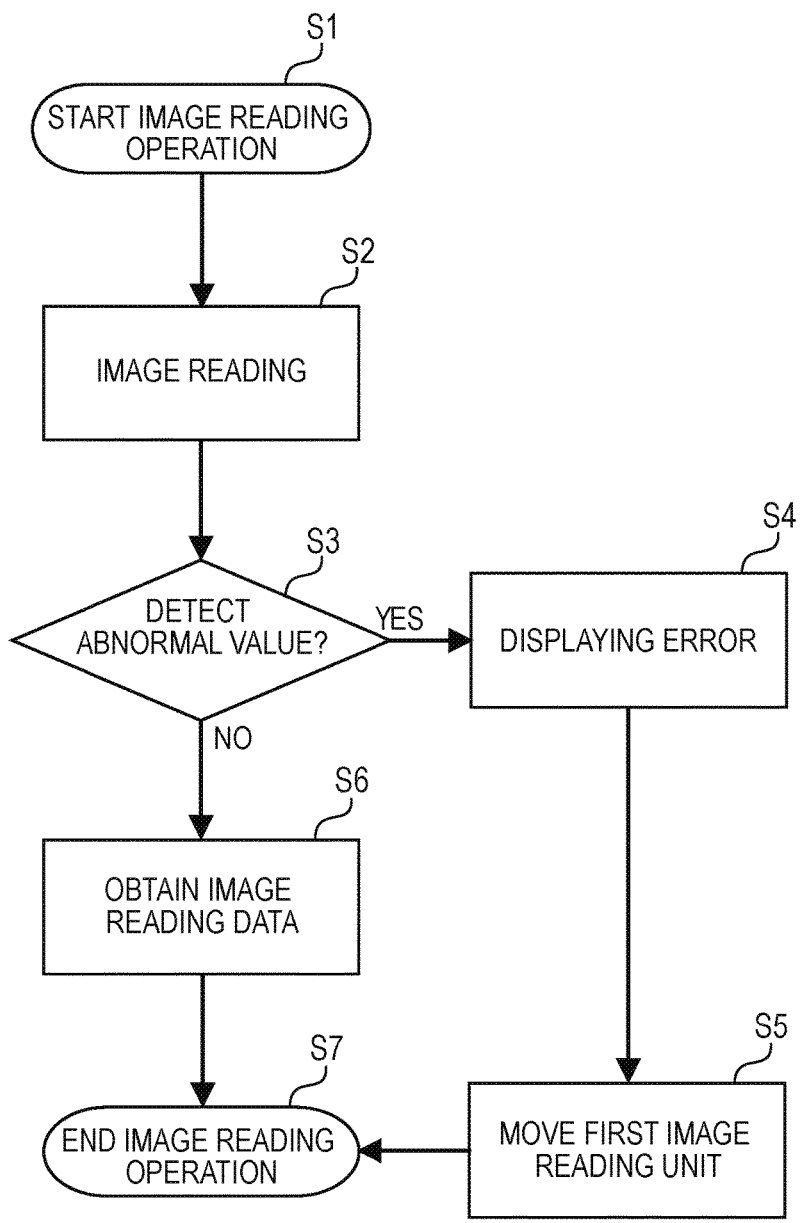

IMAGE READING APPARATUS

BACKGROUND OF THE INVENTION

Field of the Invention

The present invention relates to an image reading apparatus and relates particularly to an image reading apparatus which is provided in an image forming apparatus such as a photocopier, a facsimile apparatus, and a multifunction printer and which reads images of originals conveyed by an auto document feeder.

Description of the Related Art

Conventionally, as an image reading apparatus provided in an image forming apparatus, there has been an apparatus which includes an auto document feeder (hereafter, referred to as ADF) and which reads images of originals conveyed by the ADF.

It is known that, when the images of the originals conveyed by the ADF are read, there is a concern that adhering dusts such as glue of Post-it notes and uncured correction fluid adhering to the originals adhere onto a platen glass and cause image failures with streaks in the read images.

Japanese Patent Application Laid-Open No. 2006-265002 discloses an image reading apparatus including a platen glass to which a fluorine coating is applied to suppress adhering of the adhering dusts.

However, the fluorine coating applied onto the platen glass, when used in a high-temperature high-humidity environment, has a problem that bonding between the platen glass and the fluorine coating is destroyed and the fluorine coating turns white due to changes in properties (hereafter, referred to as white clouding). When the white clouding occurs on a surface of the fluorine coating, the spectral transmittance of the fluorine coating decreases and this leads to a decrease in image quality. In this regard, Japanese Patent Application Laid-Open No. 2006-265002 gives no consideration to such influence of the white clouding.

SUMMARY OF THE INVENTION

An object of the present invention is to provide an image reading apparatus which can suppress a decrease in image quality of a read image.

An image reading apparatus according to the present invention includes: a conveyor which conveys an original in a first direction; a light transmitting member which is provided with coating in a first region of a surface facing the original; a reading unit which reads an image at a reading position of the original through the light transmitting member; and a controller which performs processing on the image and which changes the reading position by moving the reading unit when abnormality is detected in the processing, wherein the coating includes a silicon-containing perfluoropolyether compound, an electrically-conductive member is provided in a second region located on the surface, upstream of the first region in a conveyance direction of the original, and the following conditional expression is satisfied:

$$0.46 \leq \theta(\theta_{max}+\theta_{min}) \leq 0.50$$

where θ is a contact angle of the coating at a position corresponding to the reading position in the first region, and $\theta_{max}$ and $\theta_{min}$ are a maximum value and a minimum value of the contact angle of the coating in the first region, respectively.

Further features of the present invention will become apparent from the following description of exemplary embodiments with reference to the attached drawings.

BRIEF DESCRIPTION OF THE DRAWINGS

FIG. 7 is a flowchart of an image reading operation in an actual device test of the image reading apparatus according to the first embodiment.

DESCRIPTION OF THE EMBODIMENTS

Figure 1A:
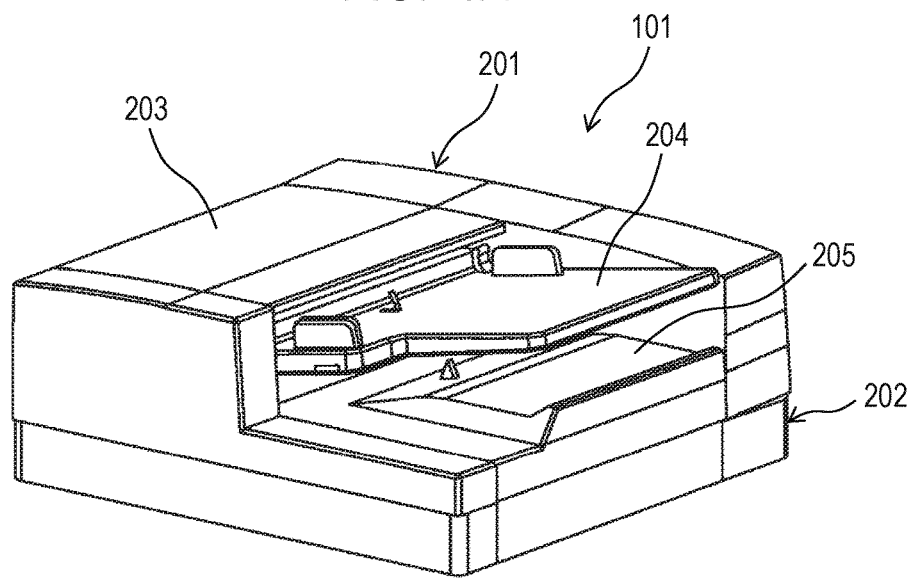
FIG. 1A is a perspective view of an image reading apparatus according to a first embodiment.

An image reading apparatus according to an embodiment is described below in detail based on the attached drawings. Note that, in the drawings described below, parts are sometimes illustrated in scales different from the actual ones to facilitate the understanding of the embodiment.

Figure 10:
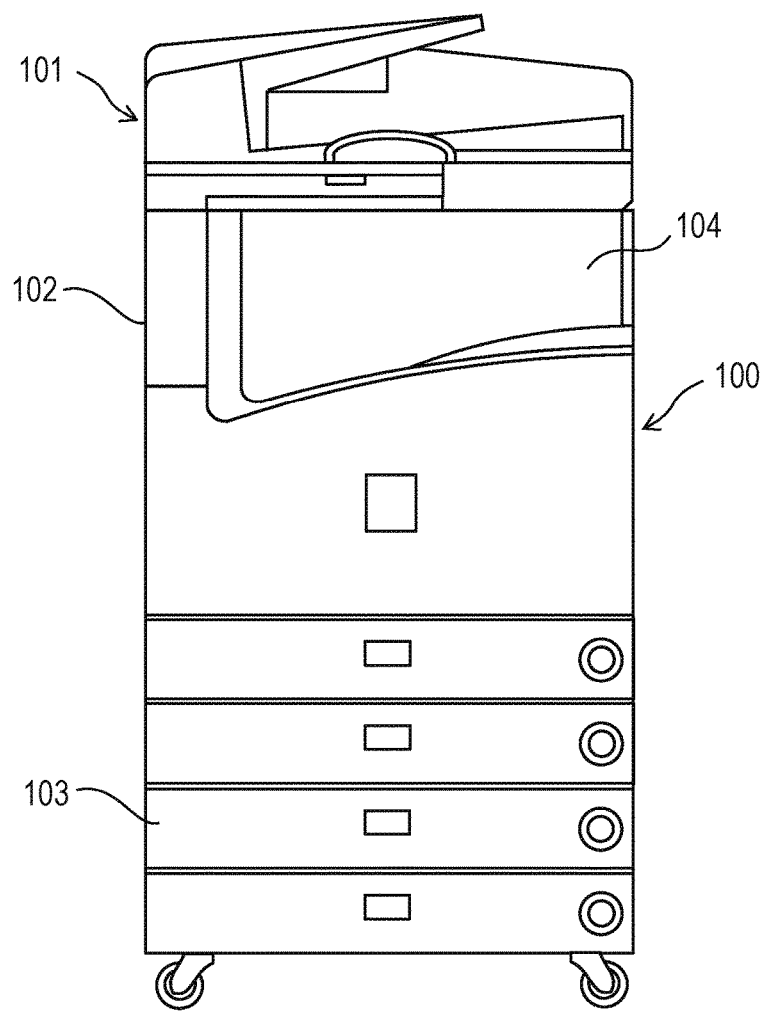
FIG. 10 is a schematic front view of an image forming apparatus including the image reading apparatus according to the first embodiment.

FIG. 10 illustrates a schematic front view of an image forming apparatus 100 including an image reading apparatus 101 according to the embodiment.

Note that the image forming apparatus 100 described below is merely an example and a facsimile apparatus, an inkjet printer, a multifunction printer, and the like which include the image reading apparatus 101 also fall into the category of the image forming apparatus including the image reading apparatus according to the embodiment.

As illustrated in FIG. 10, the image forming apparatus 100 includes an image forming unit main body (image forming unit) 102 which forms images on recoding sheets and a sheet feeding cassette 103 which is mounted below the image forming unit main body 102 and which is used to stack the recording sheets. Moreover, the image forming apparatus 100 includes the image reading apparatus 101 which is mounted above the image forming unit main body 102 and which reads images of originals.

Inside the image forming unit main body 102, a not-illustrated image forming unit is disposed substantially in a center portion and a not-illustrated sheet feeding unit which includes the sheet feeding cassette 103 and which feeds the recording sheets is disposed below the image forming unit.

Moreover, the image reading apparatus 101 including a CCD and the like is disposed above the image forming unit main body 102 which reads the images of the originals.

Furthermore, a space is provided between the image reading apparatus 101 and the image forming unit main body 102 to form a main body sheet discharging portion 104 for stacking the recording sheets conveyed and discharged by the image forming unit main body 102.

In the image forming unit main body 102, a print engine employing a conventionally well-known electrophotographic method is provided as the image forming unit. A not-illustrated laser writing unit, an electrophotographic processing unit including a photosensitive surface, a fixing unit, and the like are provided inside the print engine.

Moreover, not-illustrated sheet feeding rollers and the like which separate and feed the recording sheets stacked in the sheet feeding cassette 103 are provided inside the image forming unit main body 102 as the sheet feeding unit and supply the recording sheets to the image forming unit.

Figure 1B:
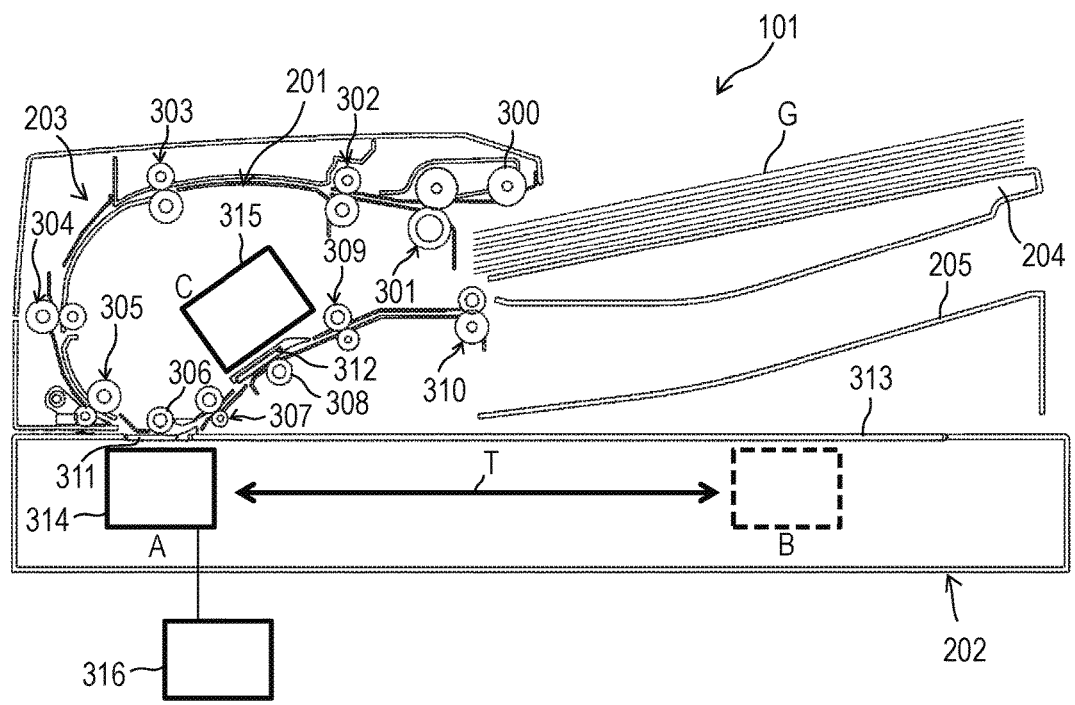
FIG. 1B is a sectional view of the image reading apparatus according to the first embodiment.

FIGS. 1A and 1B illustrate a perspective view and a sectional view of the image reading apparatus 101 according to the embodiment, respectively.

As illustrated in FIGS. 1A and 1B, the image reading apparatus 101 includes an auto document feeder (hereafter, referred to as ADF) (conveyor) 201 and a reader 202 which is provided below the ADF 201 and which reads an image on one original surface (front surface, first surface) of each original conveyed by the ADF 201.

The ADF 201 separates a plurality of originals from one another to feed the originals to the reader 202. The ADF 201 includes an original tray 204 on which the plurality of originals to be fed are placed and an original conveying unit 203 which separates the originals placed on the original tray 204 from one another to feed the originals one by one and which conveys the originals to the reader 202. Moreover, the ADF 201 includes a sheet discharging tray 205 on which the originals read by the reader 202 and then discharged are placed.

As illustrated in FIG. 1B, a pick-up roller 300 and a separation roller pair 301 which separate the plurality of originals G placed on the original tray 204 from one another to feed the originals G are provided in the ADF 201 as members forming the original conveying unit 203. Moreover, a plurality of rollers pairs 302, 303, 304, 305, 307, 309, and 310 which convey the originals G separated and fed by the separation roller pair 301 and platen rollers 306 and 308 are provided in the ADF 201 as members forming the original conveying unit 203.

Specifically, the original conveying unit 203 includes the pick-up roller 300, the separation roller pair 301, and the pull-out roller pair 302 which is provided downstream of the separation roller pair 301 and which pulls out the originals G conveyed from the separation roller pair 301.

Moreover, the original conveying unit 203 includes the conveyance roller pair 303 which is provided downstream of the pull-out roller pair 302 and which conveys the originals G conveyed by the pull-out roller pair 302 to the downstream roller pair and the registration roller pair 304 which is provided downstream of the conveyance roller pair 303 and which corrects the skewing of the originals G.

Furthermore, the original conveying unit 203 includes the first read roller pair 305, the first platen roller 306 (first conveying member) 306, the second read roller pair 307, the second platen roller 308, and the third read roller pair 309 which are provided downstream of the registration roller pair 304 and which stabilize image reading of the originals G.

As described later, when a first reading unit 314 reads an image on one original surface of each conveyed original G, the first platen roller 306 conveys the original G while biasing the original G toward a first platen glass 311 with a predetermined interval provided between the first platen roller 306 and the first platen glass 311.

Moreover, the original conveying unit 203 includes the sheet discharge roller pair 310 which is provided downstream of the third read roller pair 309 and which discharges the original G the image on which has been read to the sheet discharging tray 205.

The reader 202 is provided below the ADF 201. The first reading unit (reader) 314 which reads the images on the front surfaces of the originals G conveyed onto the first platen glass (first light transmitting member) 311 by the ADF 201 and the image of the original placed on an original table glass 313 is provided inside the reader 202 to be movable in a sub-scanning direction T on a not-illustrated rail.

When the images on the front surfaces of the originals G conveyed by the ADF 201 are to be read (in original skimming), the first reading unit 314 is stopped at a first position A below the first platen glass 311 provided in a portion facing (below) the first platen roller 306 and reads the images.

Meanwhile, when the image of the original placed on the original table glass 313 is to be read (in fixed original reading), the first reading unit 314 performs scanning while being moved in the sub-scanning direction T from the first position A to a second position B by drive of a not-illustrated motor controlled by a controller 316 and thereby reads the image of the original on the original table glass 313.

The image data of the originals read by the first reading unit 314 is processed by the controller 316.

Moreover, a second platen glass 312 is provided in a portion facing the second platen roller 308 in the ADF 201 to read an image on the other original surface (back surface, second surface being the surface opposite to the first surface) of each conveyed original G. Furthermore, a second reading unit 315 is provided at a position C facing the second platen roller 308 with the second platen glass 312 provided therebetween.

The first reading unit 314 and the second reading unit 315 can thereby read the images on the front and back surfaces of each original G when the ADF 201 conveys the original G.

Figure 2:
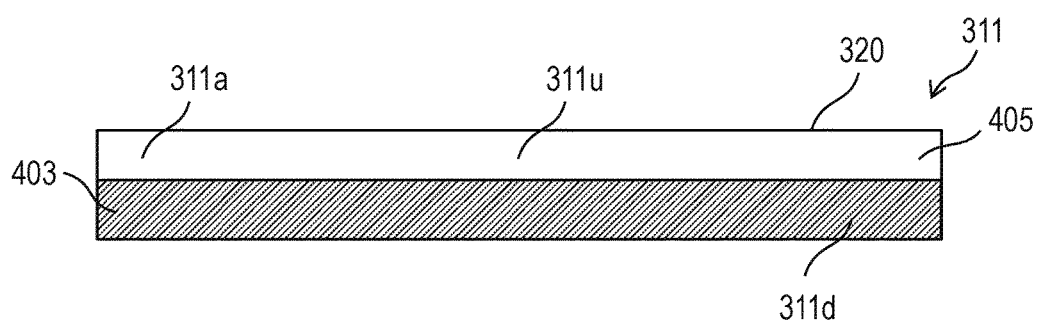
FIG. 2 is a view illustrating a fluorine coating provided on a first platen glass with an electrically-conductive resin sheet member omitted.

FIG. 2 is a view illustrating a fluorine coating 403 provided on the first platen glass 311 of the image reading apparatus 101 according to the embodiment with an electrically-conductive resin sheet member 401 omitted.

As illustrated in FIG. 2, the first platen glass 311 is provided with the transparent fluorine coating (for example, a fluorine-containing organic compound coating such as a silicon-containing perfluoropolyether compound coating) 403 in a first region 311d which is a conveyance-direction downstream portion of an original-side surface 311a of a glass substrate (base member) 320, the original-side surface 311a configured to come into contact with the conveyed originals.

The fluorine coating 403 can reduce adhering of adhering dusts such as glue and uncured correction fluid onto the first region 311d of the first platen glass 311 and thereby can reduce image failures with streaks caused by the adhering dusts.

A second region 311u located upstream of the first region 311d in the conveyance direction is a non-coated region 405 provided with no fluorine coating.

Figure 3:
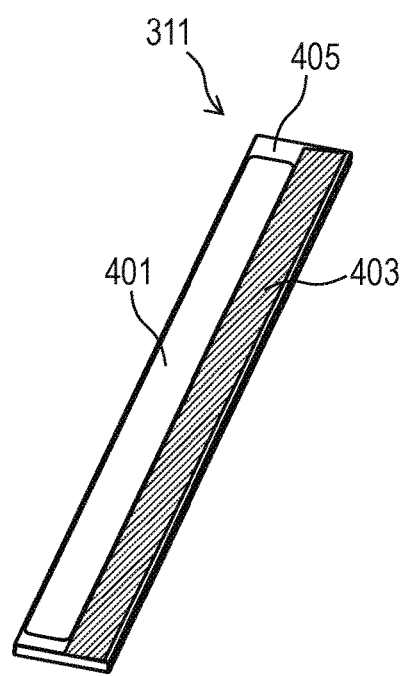
FIG. 3 is a perspective view of the first platen glass provided in the image reading apparatus according to the first embodiment.

FIG. 3 illustrates a perspective view of the first platen glass 311 provided in the image reading apparatus 101 according to the embodiment.

As illustrated in FIG. 3, the electrically-conductive resin sheet member 401 is attached to the non-coated region 405 of the first platen glass 311.

The second region 311u to which the electrically-conductive resin sheet member 401 is attached is formed to be the non-coated region 405 because, if the electrically-conductive resin sheet member 401 is attached onto the fluorine coating 403, sufficient bonding force cannot be obtained and the electrically-conductive resin sheet member 401 peels off.

Note that the non-coated region 405 may be provided by providing the fluorine coating 403 and then performing coating removal processing.

Specifically, the non-coated region 405 may be provided as follows. When the fluorine coating 403 is to be formed on the first platen glass 311 by vacuum deposition, the fluorine coating 403 is applied to the entire original-side surface 311a without using a mask. Then, in a later step, the second region 311u corresponding to the non-coated region 405 is processed by sand-blasting or the like to remove the fluorine coating 403 or reduce the effect of the fluorine coating 403.

In the image reading apparatus 101 according to the embodiment, the fluorine coating 403 is provided on the glass substrate 320 by performing vacuum deposition in a deposition chamber and no other member (intermediate layer) is provided between the fluorine coating 403 and the glass substrate 320.

The bonding energy of the fluorine coating 403 to metal oxides other than $SiO_2$ is smaller than that to $SiO_2$.

Accordingly, the fluorine coating 403 bonding with a metal oxide other than $SiO_2$, when used in a high-temperature high-humidity environment, has a problem that the bonding between the fluorine coating 403 and the metal oxide is destroyed and the fluorine coating 403 turns white due to great changes in properties (hereafter, referred to as white clouding).

Then, when the white clouding occurs on the surface of the fluorine coating 403, the spectral transmittance of the fluorine coating 403 decreases and this leads to a decrease in image quality.

Meanwhile, when the fluorine coating 403 is provided on the metal oxide via Sift serving as an intermediate layer to reduce the occurrence of white clouding, the scratch resistance of the fluorine coating 403 decreases and the durability of the coating against original conveyance decreases.

In view of this, in the embodiment, the fluorine coating 403 is provided without the intermediate layer to maintain the durability of the coating against the original conveyance and the occurrence of white clouding is dealt with by using the following configuration.

Figure 4:
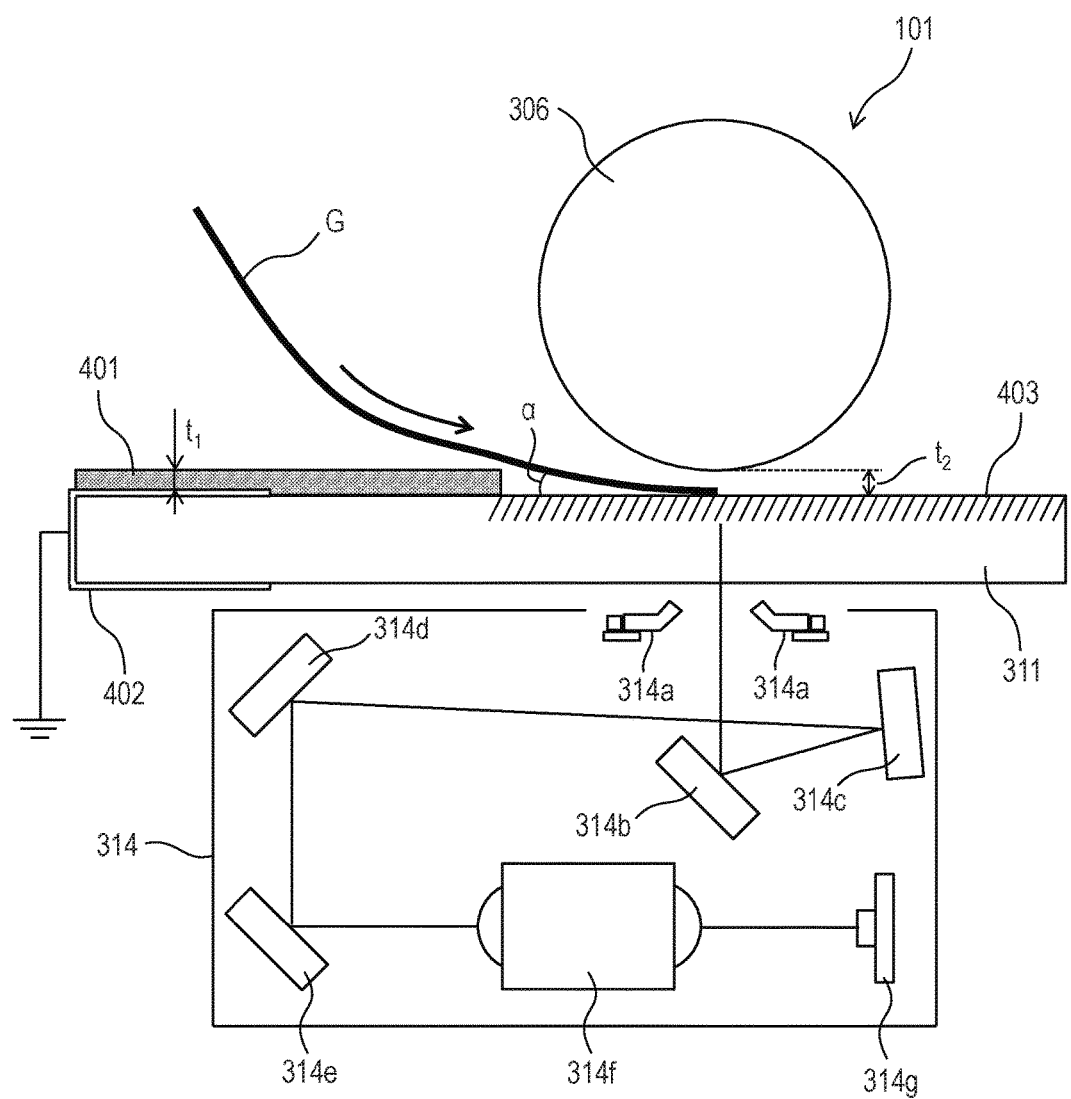
FIG. 4 is a sub-scanning sectional view of a portion near the first platen glass in the image reading apparatus according to the first embodiment.

FIG. 4 illustrates a schematic sub-scanning sectional view of a portion around the first platen glass 311 in the image reading apparatus 101 according to the embodiment.

As illustrated in FIG. 4, an aluminum tape 402 serving as an earthing part is attached to the first platen glass 311 to cover at least part of a conveyance direction upstream portion of the second region 311u which corresponds to the non-coated region 405 on the original-side surface 311a of the first platen glass 311.

Moreover, the electrically-conductive resin sheet member 401 is attached onto the aluminum tape 402 by using a not-illustrated electrically-conductive double-sided tape.

Note that, for example, a black ultra-high-molecular-weight polyethylene sheet (No. 440 black of Nitto Denko Corporation) is used as the electrically-conductive resin sheet member 401.

The electrical conductivity of the black ultra-high-molecular-weight polyethylene sheet which is the electrically-conductive resin sheet member 401 is such that the electrical resistance is 500 kΩ or less.

Accordingly, the aluminum tape 402 can electrically connect the electrically-conductive resin sheet member 401 to the main body of the image reading apparatus 101, specifically to a not-illustrated grounded metal portion such as a metal plate frame.

Electrostatic charges of the original and floating dusts attached to the original can be thereby removed by bringing the conveyed original into contact with the electrically-conductive resin sheet member 401. Then, since the floating dusts from which electrostatic charges are removed no longer adhere onto the first platen glass 311 by static electricity, the floating dusts on the first platen glass 311 can be easily removed by wiping of the conveyed original, that is by self-cleaning.

Moreover, even when the conveyed original is rubbed against the electrically-conductive resin sheet member 401, the electrically-conductive resin sheet member 401 is not charged. This charge prevention effect can prevent the floating dusts such as paper powder and dust particles around the electrically-conductive resin sheet member 401 from adhering to the electrically-conductive resin sheet member 401.

The charge prevention and charge removal effect of the electrically-conductive resin sheet member 401 as described above can reduce the image failure with streaks caused by the floating dusts such as paper powder and dust particles.

Moreover, as illustrated in FIG. 4, in the image reading apparatus 101 according to the embodiment, illuminating devices 314a in the first reading unit 314 illuminate the original G.

Then, the reflected light from the original G is reflected on folding mirrors 314b, 314c, 314d, and 314e and is condensed on an image reading sensor 314g by an imaging optical system 314f and image data of the original G is obtained.

Next, the configuration of the image reading apparatus 101 according to the embodiment and the effects of this configuration are described.

Figure 5:
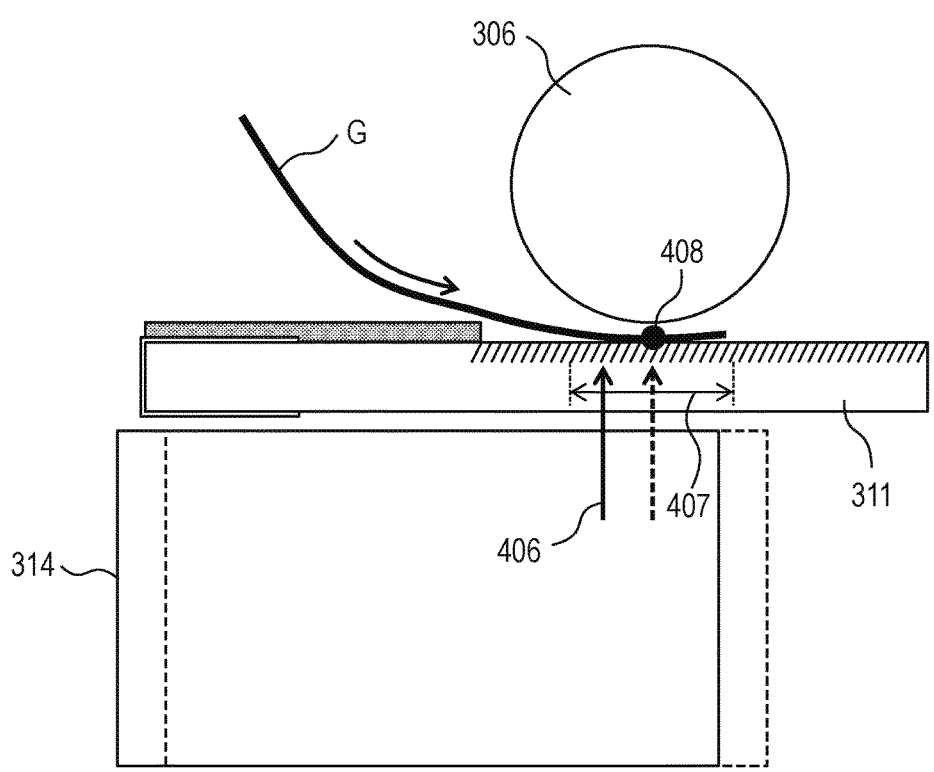
FIG. 5 is a sub-scanning sectional view of the portion near the first platen glass in the image reading apparatus according to the first embodiment.

FIG. 5 illustrates a schematic sub-scanning sectional view of the portion around the first platen glass 311 in the image reading apparatus 101 according to the embodiment.

Figure 6A:
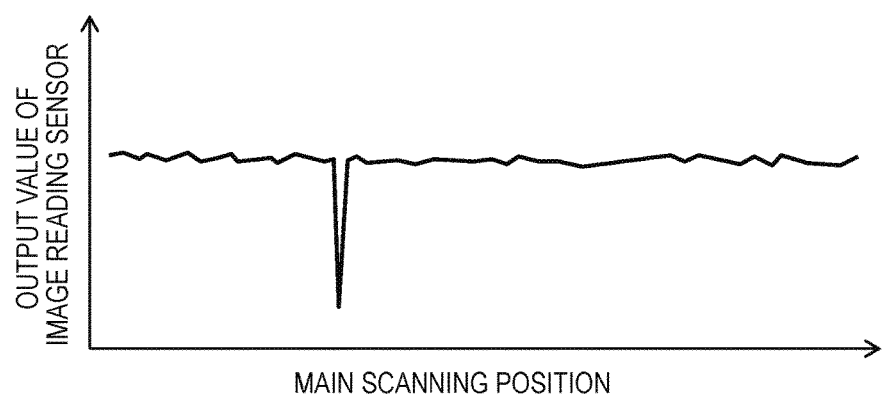
FIG. 6A is a view illustrating an output value of an image reading sensor at each position in the main scanning direction.
Figure 6B:
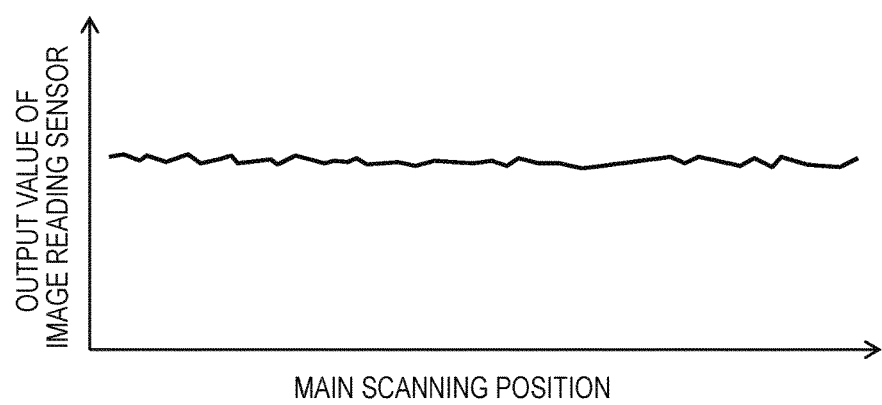
FIG. 6B is a view illustrating an output value of the image reading sensor at each position in the main scanning direction.

Moreover, FIGS. 6A and 6B illustrate output values of the image reading sensor 314g at respective positions in a main scanning direction (specifically, corresponding to brightness of the read image).

As described above, the first reading unit 314 is movable in the sub-scanning direction T and, as illustrated in FIG. 5, an original reading position 406 of the first reading unit 314 (a middle point of light sources of the two illuminating devices 314a or a center position of a not-illustrated slit in the conveyance direction (first direction)) is thereby movable within an original readable range 407.

Note that the original reading position 406 of the first reading unit 314 is not limited to that described above and may be determined depending on the internal configuration of the first reading unit 314.

In the first platen glass 311 in the embodiment, the durability of the coating against the original conveyance is maintained by providing the fluorine coating 403 without the intermediate layer as described above.

However, it is difficult to continue image reading until the end of the product life (about 1,000,000 originals are assumed to be passed through the image reading apparatus 101 according to the embodiment) without moving the original reading position 406 from its initial position (nominal position, specifically position where the original G comes closest to the first platen glass 311 in a direction perpendicular to the original G).

This is because the surface of the fluorine coating 403 is abraded with the conveyance of the originals when the image reading is performed multiple times and, as illustrated in FIG. 5, adhering dusts 408 such as glue and uncured correction fluid on the original G adheres to the surface of the first platen glass 311.

Accordingly, when the image reading is continuously performed without moving the original reading position 406 from the initial position, as illustrated in FIG. 6A, abnormality is detected in the output value of the image reading sensor 314g at a predetermined position in the main scanning direction, due to the influence of the adhering dusts 408 adhering onto the surface of the first platen glass 311 and the image failure with streaks occurs on the read image.

Note that the abnormality in this description refers specifically to, for example, the case where the output value (that is brightness of the read image) of the image reading sensor 314g is always a predetermined value or less at a predetermined position in the main scanning direction.

The detection of abnormality is not limited to this and it may detect that the output value of the image reading sensor 314g near an end portion (margin region) of the read original image is the predetermined value or less at a predetermined position in the main scanning direction.

In the image reading apparatus 101 according to the embodiment, when the abnormality relating to the output of the image reading sensor 314g is detected, the controller 316 moves the first reading unit 314 in the sub-scanning direction T such that the original reading position 406 is moved upstream in the original conveyance direction as described below.

Since the fluorine coating 403 on the surface of the first platen glass 311 at the new original reading position 406 is not abraded, no adhering dusts 408 adheres thereto.

Accordingly, as illustrated in FIG. 6B, the output value of the image reading sensor 314g is not an abnormal value at the new original reading position 406 and the image failure with streaks does not occur on the read image.

Next, description is given of an operation of moving the original reading position 406 of the first reading unit 314 in the image reading apparatus 101 according to the embodiment.

In the image reading apparatus 101 according to the embodiment, control data determined based on the results of an actual device test performed in advance is stored in a not-illustrated memory.

FIG. 7 is a flowchart of an image reading operation in the actual device test of the image reading apparatus 101 according to the embodiment.

As illustrated in FIG. 7, in the image reading apparatus 101 according to the embodiment, when the image reading operation is started in the actual device test (S1), the image reading is performed first (S2).

Then, when the controller 316 detects an abnormal value in the output values of the image reading sensor 314g (Yes in S3), the controller 316 performs error display (S4). Then, the controller 316 moves the original reading position 406 of the first reading unit 314 to a new position (S5) and ends the image reading operation (S7).

When the controller 316 detects no abnormal value in the output values of the image reading sensor 314g (No in S3), the controller 316 obtains the read image data (S6) and ends the image reading operation (S7).

When such an actual device test is performed in the image reading apparatus 101 according the embodiment, for example, test results as illustrated in the following table 1 are obtained.

TABLE 1

| Number of passed sheets | Number of abnormality detection | Reading position 0 mm (nominal) |
|---|---|---|
| 600,000 | 1 | Moved to −1 mm |
| 900,000 | 2 | Moved to −2 mm |

When 600,000 originals are passed in the actual device test, the abnormal value is detected in the output values of the image reading sensor 314g. Then, the controller 316 moves the first reading unit 314 such that the original reading position 406 is moved from the 0 mm position being the nominal position by −1 mm, that is moved upstream in the original conveyance direction by 1 mm from the 0 mm position.

Thereafter, when 900,000 originals are passed, the abnormal value is detected again in the output values of the image reading sensor 314g. Then, the controller 316 moves the first reading unit 314 such that the original reading position 406 is moved from the current −1 mm position by −1 mm, that is moved upstream in the original conveyance direction by 2 mm from the 0 mm position being the nominal position.

The reason for selecting the −1 mm and −2 mm positions, which are upstream of the 0 mm position in the original conveyance direction, as the moved positions is based on the results of studies on a contact angle described below.

Figure 8:
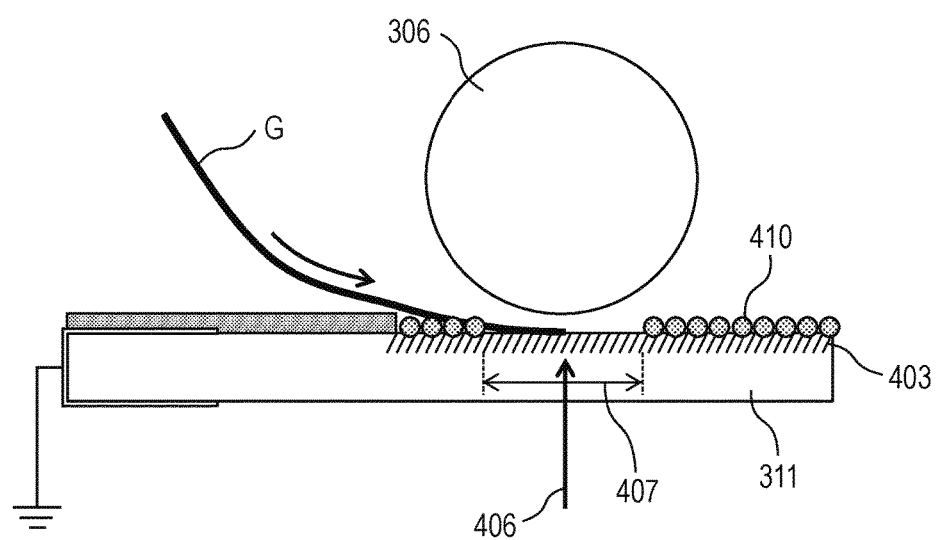
FIG. 8 is a sub-scanning sectional view of the portion near the first platen glass in the image reading apparatus according to the first embodiment.

FIG. 8 illustrates a schematic sub-scanning sectional view of the portion around the first platen glass 311 of the image reading apparatus 101 according to the embodiment.

The image forming apparatus 100 may be used not only in a normal-temperature normal-humidity environment but also in a high-temperature high-humidity environment.

In the high-temperature high humidity environment, as illustrated in FIG. 8, white clouding 410 occurs on the surface of the fluorine coating 403.

In the original readable range 407, the white clouding 410 occurring on the surface of the fluorine coating 403 can be wiped off by contact pressure of the conveyed original G. Accordingly, images can be read without being affected by the white clouding also in the high-temperature high-humidity environment.

Meanwhile, when the image reading is performed multiple times as described above, the surface of the fluorine coating 403 is abraded with the conveyance of the originals and the contact angle of the fluorine coating 403 becomes smaller. The adhering dusts 408 such as glue and uncured correction fluids on the original G thereby adhere onto the surface of the first platen glass 311.

Accordingly, in order to achieve appropriate contact pressure and contact angle, in the image reading apparatus 101 according to the embodiment, the contact angle θ of the fluorine coating 403 provided on the original-side surface of the first platen glass 311 satisfies the following conditional expression (1) at a position corresponding to the original reading position 406 when predetermined sheet passing is performed.

$$0.46 \leq \theta/(\theta_{max}+\theta_{min}) \leq 0.50 \quad (1)$$

In this formula, $\theta_{max}$ and $\theta_{min}$ are respectively the maximum value and the minimum value of the contact angle $\theta$ of the fluorine coating 403 provided on the original-side surface of the first platen glass 311 at each position when the predetermined sheet passing is performed.

When $\theta/(\theta_{max}+\theta_{min})$ falls below the lower limit value of the conditional expression (1), the contact pressure between the conveyed original G and the first platen glass 311 becomes too strong and the surface of the fluorine coating 403 is excessively abraded. The adhering dusts 408 are thus more likely to adhere.

Meanwhile, when $\theta/(\theta_{max}+\theta_{min})$ exceeds the upper limit value of the conditional expression (1), the contact pressure between the conveyed original G and the first platen glass 311 becomes too weak. In this case, when the white clouding occurs on the surface of the fluorine coating 403, the white clouding cannot be wiped off by the conveyed original G.

Hence, the range in which the original reading position 406 can be moved, that is the original readable range 407 only needs to be determined to satisfy the conditional expression (1).

Figure 9:
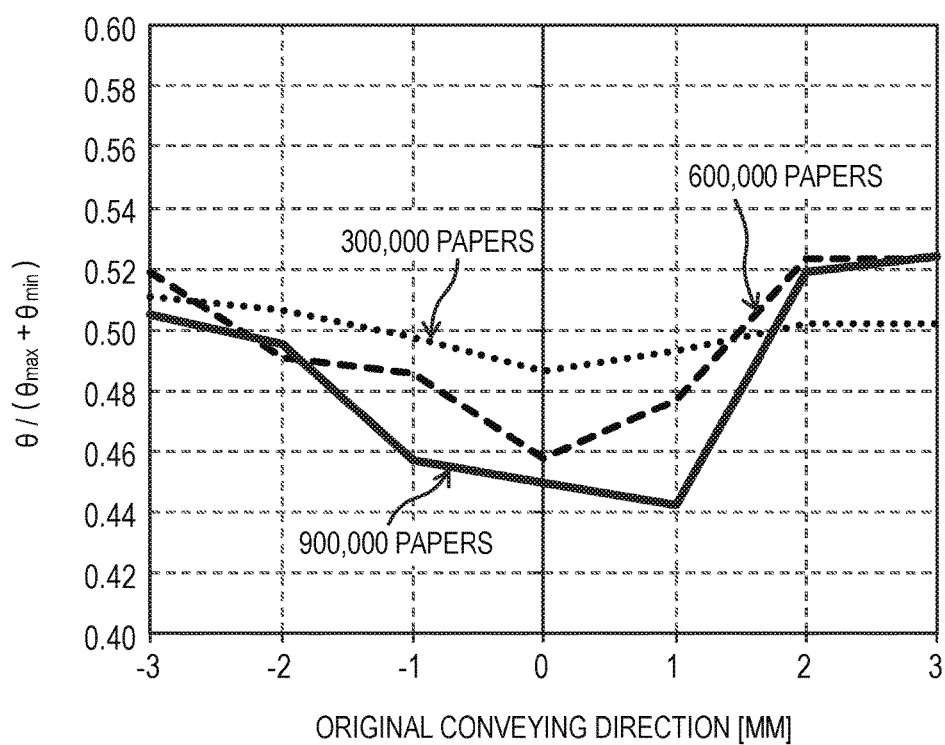
FIG. 9 is a view illustrating a value of a contact angle at each position in an original conveyance direction within an original reading range.

FIG. 9 illustrates a value of the contact angle at each position in the original conveyance direction within the original readable range 407.

Note that, in FIG. 9, the nominal position, that is the position where the original G comes closest to the first platen glass 311 in the direction perpendicular to the original G is set as 0 mm.

As illustrated in FIG. 9, as the number of passed sheets increases, the fluorine coating 403 on the surface of the first platen glass 311 is abraded and the contact angle $\theta$ becomes smaller because the contact pressure between the conveyed original and the first platen glass 311 is strong near the original reading position 406 (0 mm, first reading position) at the nominal position.

Then, when the number of passed sheets reaches 600,000, $\theta/(\theta_{max}+\theta_{min})$ near the original reading position 406 (0 mm) falls below 0.46 which is the lower limit value of the conditional expression (1) and the adhering dusts 408 adhere.

Thus, the original reading position 406 needs to be moved. However, when $\theta/(\theta_{max}+\theta_{min})$ exceeds 0.50 which is the upper limit value of the conditional expression (1), the contact pressure between the conveyed original and the first platen glass 311 becomes too weak. Accordingly, when the white clouding occurs on the surface of the fluorine coating 403, the white clouding cannot be wiped off by the conveyed original G.

Thus, the controller 316 moves the first reading unit 314 such that the original reading position 406 is moved to the −1 mm position (second reading position), that is the original reading position 406 is moved upstream in the original conveyance direction by 1 mm to satisfy the conditional expression (1).

Next, when the number of passed sheets reaches 900,000, $\theta/(\theta_{max}+\theta_{min})$ near the original reading position 406 (−1 mm) falls below 0.46 which is the lower limit value of the conditional expression (1).

Thus, the controller 316 moves the first reading unit 314 such that the original reading position 406 is moved to the −2 mm position, that is the original reading position 406 is moved further upstream in the original conveyance direction by 1 mm to satisfy the conditional expression (1).

Note that, as illustrated in FIG. 9, the positional dependence of $\theta/(\theta_{max}+\theta_{min})$ is asymmetrical and the change of $\theta/(\theta_{max}+\theta_{min})$ is more gradual on the negative side, that is the upstream side in the original conveyance direction.

Accordingly, in the image reading apparatus 101 according to the embodiment, the first reading unit 314 is moved such that the original reading position 406 is moved upstream in the original conveyance direction.

Moreover, in the image reading apparatus 101 according to the embodiment, the thickness $t_1$ of the electrically-conductive resin sheet member 401 satisfies the following conditional expression (2) over the entire region in the main scanning direction (longitudinal direction of the first platen glass 311, direction perpendicular to the original conveyance direction in a plane parallel to the surface of the first platen glass 311).

$$0.1 \text{ mm} < t_1 < 0.65 \text{ mm} \quad (2)$$

When the thickness $t_1$ falls below the lower limit value of the conditional expression (2), the contact pressure between the conveyed original G and the first platen glass 311 becomes too strong and the surface of the fluorine coating 403 is excessively abraded. The adhering dusts 408 are thus more likely to adhere.

Meanwhile, when the thickness $t_1$ exceeds the upper limit value of the conditional expression (2), the contact pressure between the conveyed original G and the first platen glass 311 becomes too weak. In this case, when the white clouding occurs on the surface of the fluorine coating 403, the white clouding cannot be wiped off by the conveyed original G.

Hence, the thickness $t_1$ of the electrically-conductive resin sheet member 401 only needs to be determined to satisfy the conditional expression (2).

Moreover, in the image reading apparatus 101 according to the embodiment, an interval $t_2$ between the first platen glass 311 and a portion of the first platen roller 306 closest to the first platen glass 311 satisfies the following conditional expression (3) over the entire region in the main scanning direction.

$$0.1 \text{ mm} \leq t_2 < 0.5 \text{ mm} \quad (3)$$

When the interval $t_2$ falls below the lower limit value of the conditional expression (3), the contact pressure between the conveyed original G and the first platen glass 311 becomes too strong and the surface of the fluorine coating 403 is excessively abraded. The adhering dusts 408 are thus more likely to adhere.

Meanwhile, when the interval $t_2$ exceeds the upper limit value of the conditional expression (3), the contact pressure between the conveyed original G and the first platen glass 311 becomes too weak. In this case, when the white clouding occurs on the surface of the fluorine coating 403, the white clouding cannot be wiped off by the conveyed original G.

Hence, the interval $t_2$ between the first platen glass 311 and the portion of the first platen roller 306 closest to the first platen glass 311 only needs to be determined to satisfy the conditional expression (3).

Moreover, in the image reading apparatus 101 according to the embodiment, the angle (angle of the original G approaching the first platen glass 311) $\alpha$ formed between a downstream portion of the original surface of the conveyed original G and the surface of the first platen glass 311 satisfies the following conditional expression (4) over the entire region in the main scanning direction.

$$0° \leq \alpha \leq 30° \quad (4)$$

When the angle α exceeds the upper limit value of the conditional expression (4), the contact pressure between the conveyed original G and the first platen glass 311 becomes too weak. In this case, when the white clouding occurs on the surface of the fluorine coating 403, the white clouding cannot be wiped off by the conveyed original G.

Hence, the angle α formed between the downstream portion of the original surface of the conveyed original G and the surface of the first platen glass 311 only needs to be determined to satisfy the conditional expression (4).

Moreover, in the image reading apparatus 101 according to the embodiment, the thickness $t_1$ of the electrically-conductive resin sheet member 401 and the interval $t_2$ between the first platen glass 311 and the portion of the first platen roller 306 closest to the first platen glass 311 satisfy the following conditional expression (5) in at least part of the region in the main scanning direction.

$$0.1 \text{ mm} \leq t_2 \leq t_1 \tag{5}$$

When the interval $t_2$ falls below the lower limit value of the conditional expression (5), the contact pressure between the conveyed original G and the first platen glass 311 becomes too strong and the surface of the fluorine coating 403 is excessively abraded. The adhering dusts 408 are thus more likely to adhere.

Meanwhile, when the interval $t_2$ exceeds the upper limit value of the conditional expression (5), the contact pressure between the conveyed original G and the first platen glass 311 becomes too weak. In this case, when the white clouding occurs on the surface of the fluorine coating 403, the white clouding cannot be wiped off by the conveyed original G.

Hence, the thickness $t_1$ of the electrically-conductive resin sheet member 401 and the interval $t_2$ between the first platen glass 311 and the portion of the first platen roller 306 closest to the first platen glass 311 only needs to be determined to satisfy the conditional expression (5).

Although the preferable embodiment has been described above, the present invention is not limited to the aforementioned embodiment and various modifications and changes can be made within the gist of the invention.

For example, although the aforementioned operations are determined from the actual device test in the image reading apparatus 101 according to the first embodiment, the operations may be determined by performing simulation.

Moreover, the aforementioned numerical values relating to the results of the actual device test are merely examples and the change amount of the original reading position and the number of times of changing the original reading position may be increased or decreased depending on the results of the actual device test.

The present invention can provide an image reading apparatus which can suppress a decrease in the image quality of the read image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-198259, filed Oct. 12, 2017, which is hereby incorporated by reference herein in its entirety.

What is claimed is:

1. An image reading apparatus comprising:
   a conveyor which conveys an original in a first direction;
   a light transmitting member which is provided with coating in a first region of a surface facing the original;
   a reading unit which reads an image at a reading position of the original through the light transmitting member; and
   a controller which performs processing on the image and which changes the reading position by moving the reading unit when abnormality is detected in the processing, wherein
   the coating includes a silicon-containing perfluoropolyether compound, an electrically-conductive member is provided in a second region located on the surface, upstream of the first region in a conveyance direction of the original, and the following conditional expression is satisfied:

$$0.46 \leq \theta(\theta_{max}+\theta_{min}) \leq 0.50$$

where θ is a contact angle of the coating at a position corresponding to the reading position in the first region, and $\theta_{max}$ and $\theta_{min}$ are a maximum value and a minimum value of the contact angle of the coating in the first region, respectively.

2. The image reading apparatus according to claim 1, wherein the abnormality includes a case where brightness of the image is always a predetermined value or less at a predetermined position in a direction parallel to the surface and perpendicular to the first direction.

3. The image reading apparatus according to claim 1, wherein the coating is provided on the surface without any member provided between the coating and the surface.

4. The image reading apparatus according to claim 1, wherein the controller moves the reading unit upstream in the conveyance direction when the abnormality is detected in the processing.

5. The image reading apparatus according to claim 1, wherein the following conditional expression is satisfied:

$$0.1 \leq t_1 < 0.65$$

where $t_1$ [mm] is a thickness of the member.

6. The image reading apparatus according to claim 1, wherein the conveyor includes a conveying member which conveys the original while biasing the original toward the surface, and the following conditional expression is satisfied over an entire region in a direction parallel to the surface and perpendicular to the first direction:

$$0.1 \leq t_2 \leq 0.5$$

where $t_2$ [mm] is an interval between the surface and a portion of the conveying member closest to the surface.

7. The image reading apparatus according to claim 1, wherein the following conditional expression is satisfied over an entire region in a direction parallel to the surface and perpendicular to the first direction:

$$0 < \alpha \leq 30$$

where α [deg] is an angle of the original approaching the surface.

8. The image reading apparatus according to claim 1, wherein
   the conveyor includes a conveying member which conveys the original while biasing the original toward the surface, and
   the following conditional expression is satisfied in at least part of a region in a direction parallel to the surface and perpendicular to the first direction:

$$0.1 \leq t_2 \leq t_1$$

where $t_1$ [mm] is a thickness of the member and $t_2$ [mm] is an interval between the surface and a portion of the conveying member closest to the surface.

9. An image forming apparatus comprising:
the image reading apparatus according to claim 1; and
an image forming unit which forms an image on a photosensitive surface based on the image of the original.

* * * * *